(12) United States Patent
Matsubara et al.

(10) Patent No.: US 8,588,217 B2
(45) Date of Patent: Nov. 19, 2013

(54) TRANSPORT CONTROL SYSTEM AND TRANSPORT CONTROL SERVER

(75) Inventors: Daisuke Matsubara, Yokohama (JP); Hitoshi Yabusaki, Tokyo (JP); Yoji Ozawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 13/203,828

(22) PCT Filed: Mar. 2, 2010

(86) PCT No.: PCT/JP2010/053330
§ 371 (c)(1),
(2), (4) Date: Oct. 7, 2011

(87) PCT Pub. No.: WO2010/150575
PCT Pub. Date: Dec. 29, 2010

(65) Prior Publication Data
US 2012/0020357 A1  Jan. 26, 2012

(30) Foreign Application Priority Data
Jun. 25, 2009  (JP) ................................. 2009-150947

(51) Int. Cl.
*H04L 12/66* (2006.01)
*H04L 12/28* (2006.01)

(52) U.S. Cl.
USPC ............ 370/352; 370/389; 370/392; 370/401

(58) Field of Classification Search
USPC .................................. 370/352, 389, 392, 401
See application file for complete search history.

(56) References Cited

U.S. PATENT DOCUMENTS

| | | | |
|---|---|---|---|
| 2002/0101868 A1* | 8/2002 | Clear et al. | 370/389 |
| 2008/0212595 A1 | 9/2008 | Figueira et al. | |
| 2008/0219268 A1 | 9/2008 | Dennison | |
| 2009/0073997 A1* | 3/2009 | Teng | 370/401 |
| 2009/0129289 A1* | 5/2009 | Waggener et al. | 370/254 |
| 2010/0226381 A1* | 9/2010 | Mehta et al. | 370/401 |
| 2011/0188509 A1* | 8/2011 | Kern et al. | 370/408 |

FOREIGN PATENT DOCUMENTS

| | | |
|---|---|---|
| JP | 2005252385 A | 9/2005 |
| JP | 2008067118 A | 3/2008 |
| WO | 2008089370 A1 | 7/2008 |

* cited by examiner

*Primary Examiner* — Brandon Renner
(74) *Attorney, Agent, or Firm* — Volpe And Koenig, P.C.

(57) ABSTRACT

A transport control server (100) wherein a conversion table including a pre-conversion identifier and a post-conversion identifier, and a conversion type indicating the aggregate/ transfer of a path are previously stored for each two segments that are connected to each other. When devices (111, 118) at the endpoints of the path are specified, the transport control server (100) calculates the route between the devices to identify one or a plurality of gateway nodes (112 to 117) on the route. Also, the transport control server (100) acquires from a storage unit the pre-conversion identifier, post-conversion identifier, and conversion type corresponding to two segments that are connected by the identified nodes for each of the identified nodes, and sets the acquired identifiers and conversion type to each of the nodes. Each of the nodes encapsulates and transmits a received packet including the set pre-conversion identifier using the set post-conversion identifier, or replaces the set pre-conversion identifier with the set post-conversion identifier and transmits the post-conversion identifier in accordance with the set conversion type.

19 Claims, 11 Drawing Sheets

FIG.4  SEGMENT/PATH TECHNIQUE CORRESPONDENCE
TABLE IN SEGMENT STORAGE 207

| SEGMENT ID | PATH TECHNIQUE INFORMATION |
|---|---|
| A | PBB |
| B | MPLS |
| C | VLAN |
| D | PB |
| ⋮ | ⋮ |

FIG.5

CONVERSION SCHEME CORRESPONDENCE TABLE IN CONVERSION SCHEME STORAGE 208

| INPT-SIDE NW (INPUT-SIDE SEGMENT) 501 | OUTPUT-SIDE NW (OUTPUT-SIDE SEGMENT) 502 | AGGREGATION VALID/ INVALID INFORMATION 503 | TRANSFER VALID/ INVALID INFORMATION 504 |
|---|---|---|---|
| VLAN | VLAN | — | O |
| VLAN | PB | O | — |
| VLAN | MPLS | O | O |
| VLAN | MPLS-TP | O | O |
| ⋮ | ⋮ | ⋮ | ⋮ |

FIG.6

IDENTIFIER CORRESPONDENCE TABLE IN CONVERSION SCHEME STORAGE 208 ~700

| INPUT-SIDE NW (INPUT-SIDE SEGMENT) 701 | OUTPUT-SIDE NW (OUTPUT-SIDE SEGMENT) 702 | CONVERSION TYPE 703 | PRE-CONVERSION IDENTIFIER 704 | POST-CONVERSION IDENTIFIER 705 | IDENTIFIER DRAW-OUT METHOD 706 |
|---|---|---|---|---|---|
| VLAN | VLAN | TRANSFER | C-TAG | C-TAG | 1. NOVEL DRAW-OUT OF C-TAG FROM POOL<br>2. UTILIZATION OF C-TAG BEFORE CONVERSION |
| VLAN | PB | AGGREGATION | C-TAG | S-TAG, I-TAG, B-TAG | 1. NOVEL DRAW-OUT OF S-TAG, I-TAG AND B-TAG FROM POOL |
| ------- | ------- | ------- | ------- | ------- | ------- |
| PBB | MPLS | AGGREGATION | C-TAG, S-TAG, I-TAG, B-TAG | LSP | 1. NOVEL DRAW-OUT OF LSP FROM POOL |
| PBB | MPLS | TRANSFER | C-TAG, S-TAG, I-TAG, B-TAG | LSP | 1. NOVEL DRAW-OUT OF LSP FROM POOL<br>1. PUTTING C-TAG INTO LOWER BIT<br>2. PUTTING S-TAG INTO LOWER BIT<br>3. PUTTING I-TAG INTO LOWER BIT<br>4. PUTTING C-TAG AND S-TAG INTO LOWER BIT |
| ------- | ------- | ------- | ------- | ------- | ------- |

FIG.9

CONVERSION TABLE IN CONVERSION TABLE STORAGE 209

CONVERSION TABLE 900

| Virtual Path ID 901 | I-CPE 902 | E-CPE 903 | Traffic Class 904 | C-TAG 905 | S-TAG 906 | I-TAG 907 | B-TAG 908 | LSP 909 |
|---|---|---|---|---|---|---|---|---|
| | | | | ----- | | | | |
| | | | | ----- | | | | |
| | | | | ----- | | | | |
| 001 | 001 | 002 | A | 001 | 001 | 001 | 001 | 001 |
| | | | | ----- | | | | |
| | | | | ----- | | | | |

FIG. 13   SEGMENT CORRESPONDENCE TABLE IN SEGMENT STORAGE 207

| SEGMENT ID (411) | SEGMENT ID (412) |
|---|---|
| A | F |
| B | E |
| C | D |
| ⋮ | ⋮ |

410

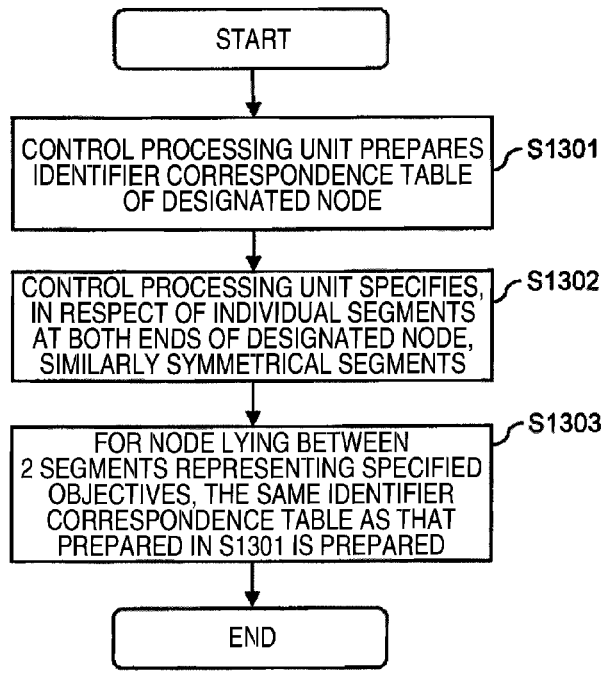

FIG. 14

START
↓
S1301 — CONTROL PROCESSING UNIT PREPARES IDENTIFIER CORRESPONDENCE TABLE OF DESIGNATED NODE
↓
S1302 — CONTROL PROCESSING UNIT SPECIFIES, IN RESPECT OF INDIVIDUAL SEGMENTS AT BOTH ENDS OF DESIGNATED NODE, SIMILARLY SYMMETRICAL SEGMENTS
↓
S1303 — FOR NODE LYING BETWEEN 2 SEGMENTS REPRESENTING SPECIFIED OBJECTIVES, THE SAME IDENTIFIER CORRESPONDENCE TABLE AS THAT PREPARED IN S1301 IS PREPARED
↓
END

TRANSPORT CONTROL SYSTEM AND TRANSPORT CONTROL SERVER

INCORPORATION BY REFERENCE

The present application claims the priority of Japanese Patent Application No. 2009-150947 filed on 25-th of Jun. in 2009 and incorporates it by making reference to its contents.

TECHNICAL FIELD

The present invention relates to a transport control system and a transport control server and more particularly, to a transport control system and a transport control server wherein path setting is automated in mutual coupling between different path techniques.

BACKGROUND ART

Recently, need for a communication carrier adapted to control route/resource of data traffic has been increasing. For example, it has been required that a redundant route is prepared in advance and the route is switched at high speeds in the event of a fault, thus realizing a high reliability, that the route/resource is separated for individual different services to realize virtuality and that the traffic load is dispersed and optimized by traffic engineering to improve the efficiency of resource utilization.

Also, for control of the route and resource, the communication carrier makes use of, for example, a path technique for plural L2 (Layer 2) virtuality rendering, thereby realizing high reliability of core network, presentation of a VPN (Virtual Private Network) service to enterprises and establishment of NGN (next Generation Network) transport. Known as such path techniques are, in the MPLS (Multi-Protocol Label Switching System), for example, MPLS, G-MPLS (Generalized Multi-Protocol Label Switching), MPLS-TP (MPLS-Transport Profile) and MPLS directed to transport: old T-MPLS (Transport-MPLS). Also, in the Ether system, VLAN (Virtual LAN), PB (Provider Bridging) (Q—in—Q), PBB (Provider Backbone Bridging) and MAC (Media Access Control)—in—MAC) are known.

Then, for example, in connection with a device for inter-work from VLAN network to MPLS network, it is disclosed that the MPLS level of output is determined from a set of VLAN ID and layer 3 layer 4 header information of a packet (see PATENT LITERATURE 1, for instance). Further, a technique is disclosed according to which, for example, a service identifier is allotted to a LSP (TE-LSP) for tunnel and a service identifier is allotted to path setting request signaling, so that only LSP's for which the TE-LSP has the same service identifier can be accommodated (see PATENT LITERATURE 2, for instance). Furthermore, a technique concerning PBT (Provider Backbone Transport) and MPLS is disclosed (see PATENT LITERATURES 3 and 4, for instance).

CITATION LIST

Patent Literatures
  PATENT LITERATURE 1: JP-A-2008-67118
  PATENT LITERATURE 2: JP-A-2005-252385
  PATENT LITERATURE 3: US PATENT APPLICATION DISCLOSURE NO. 2008/0212595
  PATENT LITERATURE 4: US PATENT APPLICATION DISCLOSURE NO. 2008/0219268

SUMMARY OF INVENTION

Technical Problem

As the access network and the aggregation network become variegated and besides, the coupling to plural data centers and the inter-coupling to another network increase, route setting is required to be automated. Also, as the user increases in number and the coupling scheme becomes complicated, the route setting costs sometimes increase. For example, in performing inter-coupling between different kinds of path techniques, the operator sets manually each edge node (gateway node) with the help of a CLI (Command Line Interface) or command input interface and a NMS (Network Management System) and therefore, the running cost increases and such a risk of erroneous setting increases in some case.

Also, in the inter-coupling between different kinds of path techniques, a variety of aggregation and transfer schemes are available and so, standards of inter-coupling between different kinds of path techniques are not fixed and the operator deals with the inter-coupling on the basis of an own running policy in many cases. When performing the inter-coupling between different kinds of path techniques, even principal inter-coupling patterns are large in number and the inter-coupling needs to be dealt with through patterns formed in respect of individual systems, making it difficult to automate all of path setting.

In the light of the above points, the present invention has for its object to provide a transport control system and a transport control server wherein aggregation and transfer schemes of inter-coupling between different path techniques are set on the basis of a scheme the network operator designates in advance and end to end path setting can be automated.

Solution to Problem

According to a first solution of the present invention, a transport control system is provided comprising, in a network through which communication is made between devices by way of a plurality of network segments of different path techniques, a plurality of gateway nodes each arranged between two network segments to be coupled thereto and adapted to convert a header of a received packet in accordance with the path techniques of the two network segments and to transmit the converted header and a transport control server for controlling the gateway nodes, wherein the transport control server includes;

a conversion table storage stored in advance with a conversion table containing a pre-conversion identifier for specifying a packet subject to aggregation of path or transfer of path in respect of each of the two network segments to be coupled and a post-conversion identifier to be added to a header of a received packet and with conversion types indicative of aggregation of path or transfer of path, and a control processing unit, and wherein the control processing unit calculates, when the devices at the endpoints of a path are designated, a route between the devices and specifies one or a plurality of the gateway nodes on the route, acquires, for the individual specified gateway nodes, pre-conversion identifiers, post-conversion identifiers and conversion types corresponding to the two network segments the gateways couple from the conversion table storage and sets them to the gateway nodes, and the gateway node encapsulates, when the set conversion type indicates aggregation, the received packet containing the set pre-conversion identifier by using the set post-conversion identifier and transmits the encapsulated received packet, and replaces the pre-conversion identifier with the set post-conversion identifier for the received packet containing the set pre-conversion identifier when the set conversion type indicates transfer and transmits the received packet added with the post-conversion identifier.

According to a second solution of the present invention, a transport control server is provided for use in a transport control system having, in a network through which communication is made between devices by way of a plurality of network segments of different path techniques, a plurality of gateway nodes each arranged between two network segments to be coupled and adapted to encapsulate, when a set conversion type indicates aggregation, a received packet containing the set pre-conversion identifier by using the set post-conversion identifier and transmits the encapsulated received packet and to replace, when the set conversion type indicates transfer, the pre-conversion identifier with the set post-conversion identifier for the received packet containing the set pre-conversion identifier and to transmit the received packet added with the post-conversion identifier, the transport control server being operative to control the gateway nodes, the transport control server comprises:

a conversion table storage stored in advance with a conversion table containing a pre-conversion identifier for specifying a packet subject to aggregation of route or transfer of route in respect of each of the two network segments to be coupled and a post-conversion identifier to be added to a header of a received packet and with conversion types indicative of aggregation of route or transfer of route, and a control processing unit, wherein the control processing unit calculates, when the devices at the endpoints of a path are designated, a route between the devices and specifies one or a plurality of the gateway nodes on the route, and acquires, for the individual specified gateway nodes, pre-conversion identifiers, post-conversion identifiers and conversion types corresponding to the two network segments the gateways couple from the conversion table storage and sets them to the gateway nodes.

Advantageous Effects of Invention

According to the present invention, a transport control system and a transport control server can be provided wherein aggregation and transfer schemes of inter-coupling between different path technique s are set through a scheme the network operator designates in advance and end to end route setting can be automated.

Other objects, features and advantages of the present invention will become apparent from a description of embodiments of the invention taken in conjunction with the accompanying drawings.

BRIEF DESCRIPTION OF DRAWINGS

FIG. 4 is a diagram for explaining a segment/path technique correspondence table.

FIG. 5 is a diagram for explaining a conversion scheme correspondence table.

FIG. 6 is a diagram for explaining an identifier correspondence table.

FIG. 9 is a diagram for explaining a conversion table.

FIG. 13 is a diagram for explaining a segment symmetry correspondence table.

FIG. 14 is a flowchart for preparation of an identifier correspondence table for a node between symmetrical segments.

DESCRIPTION OF EMBODIMENTS

Figure 10:
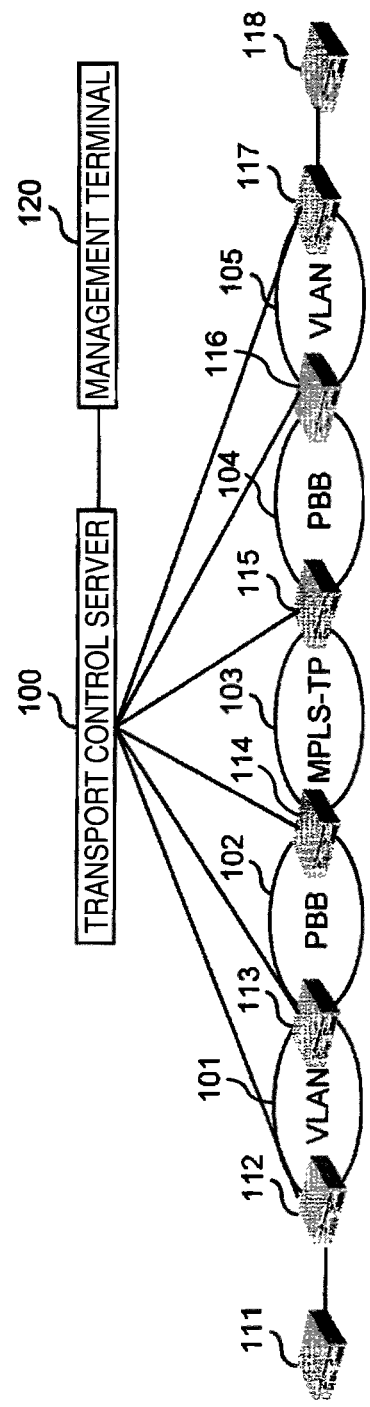
FIG. 10 is a diagram illustrating configuration of a transport control system.

FIG. 10 illustrates the construction of a transport control system.

The present transport control system comprises, for example, a transport control server 100, a plurality of nodes (gateway nodes) 112 to 117, CPE's (Customer Premises Equipment, user devices) 111 and 118, and a management terminal 120.

The individual nodes 112 to 117 are gateway nodes located at network endpoints of individual segments (network segments) 101 to 105, respectively, and can be coupled with the individual segments 101 to 105 of different path techniques. As the path techniques of the individual segments 101 to 105, VLAN, PBB, MPLS-TP and so on, for instance, can be used. Putting the illustrated example aside, such suitable path techniques as PB and MPLS may be used for the individual segments 101 to 105. The paths are stretched between the CPE 111 and CPE 118 and communication is conducted through the medium of nodes 112 to 117 and segments 101 to 105.

The transport control server 100 communicates with the nodes 112 to 117 and the management terminal 120. The operator manipulates the management terminal 120 to input pieces of information of nodes 112 to 117, links and segments 101 to 105 to the transport control server 100 and the transport control server 100 in turn sets metrics of the links and nodes 112 to 117. The metrics is used for calculation of, for example, a route between the CPE's 111 and 118. The transport control server 100 can automatically judge gateway nodes intervening between the segments 101 and 105. Exemplarily, the management terminal 120 has an input unit to input information under operation by the operator, a display unit for displaying information from the transport control server 100 and an interface for communication of the pieces of information with the transport control server 100. The transport control server 100 and the management terminal 120 may be constructed integrally. While, in the example in FIG. 10, one node is arranged between adjacent segments, a plurality of nodes may be arranged between them.

Figure 1:
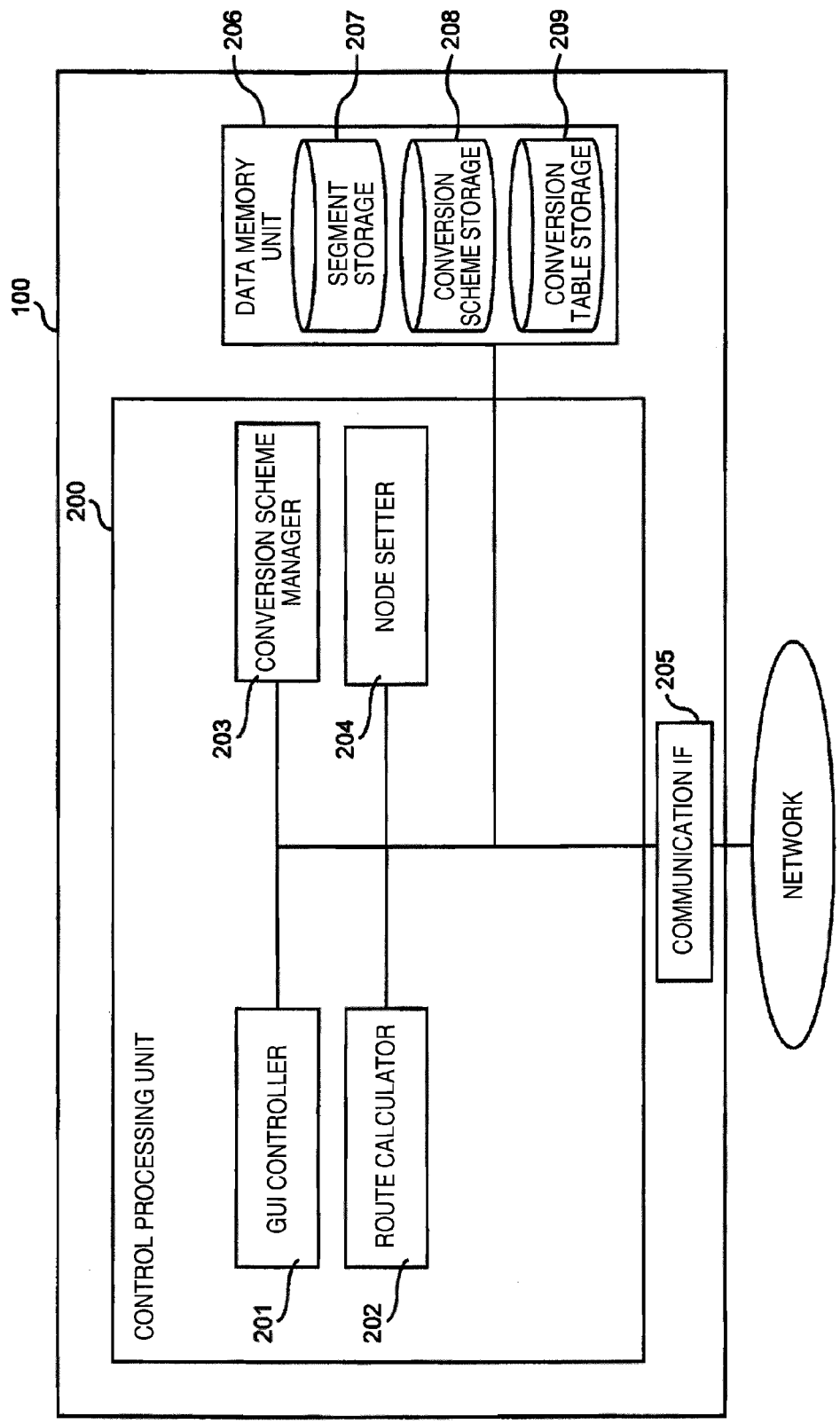
FIG. 1 is a diagram showing construction of a transport control server.

FIG. 1 diagrammatically illustrates construction of the transport control sever 100. The transport control server 100 includes, for example, a control processing unit 200, a communication IF 205, and a data memory unit 206. The control processing unit 200 has a GUI controller 201, a route calculator 202, a conversion scheme manager 203 and a node setter 204. The data memory unit 206 has a segment storage 207, a conversion scheme storage 208 and a conversion table storage 209.

The segment storage 207 is stored with a segment/path technique correspondence table 400. Then, the conversion scheme storage 208 is stored with a conversion scheme correspondence table 500 and an identifier correspondence table 700. The conversion table storage 209 is stored with a conversion table 900. It will be appreciated that the segment/path technique correspondence table 400, the conversion scheme correspondence table 500, the identifier correspondence table 700 and the conversion table 900 may not necessarily be stored separately in each of the storages 207 to 209. The structure of each table will be described later.

The GUI controller 201 communicates with the management terminal 120 via the communication IF 205 to control input/output of data. The route calculator 202 retrieves routes between CPE's 111 and 118 to determine an optimum route. The conversion scheme manger 203 prepares the conversion table 900 on the basis of an identifier of a header/label (pre-conversion identifier) referred to upon conversion of a path technique selected by the operator and an identifier of a header/label (post-conversion identifier) after the path technique conversion. The node setter 204 sets the contents of conversion table 900 and the conversion scheme (conversion type) selected by the operator to the nodes 112 to 117. The communication IF 205 is an interface for communication with the external devices such as, for example, management terminal 120 and nodes 112 to 117.

FIG. 4 diagrammatically explains the segment/path correspondence table 400.

The segment/path correspondence table 400 contains path technique information 402 in correspondence to, for example, segment ID 401. For example, a letter or number suitable to specify each of the segments 101 to 105 can be used for the segment ID 401. The path technique information 402 indicates path techniques used by the individual segments 101 to 105 and pieces of information indicative of, for example, [PBB], [MPLS], [VLAN], [PB] and [MPLS-TP] are stored. It is to be noted that the individual pieces of information of the segment/path technique correspondence table 400 are stored in advance.

FIG. 5 diagrammatically explains the conversion scheme correspondence table 500.

The conversion scheme correspondence table 500 contains, for example, path technique information 501 of input side NW's (input side segments), path technique information 502 of output side NW's (output side segments), aggregation valid/invalid information 503 and transfer valid/invalid information 504. It will be appreciated that exemplarily, in the present embodiment, for a node intervening between two segments and coupled thereto, the side for reception of a packet is called input side and the side for transmission of the packet is called output side.

The path technique information 501 of input side NW indicates a path technique used in the input side segment. The path technique information 502 of output side NW indicates a path technique used in the output side segment. The aggregation valid/invalid information 503 makes an indication as to whether conversion of path technique based on aggregation is possible between the path technique the input side NW path technique information 501 indicates and the path technique the output side NW path technique information 502 indicates. Exemplarily, when the aggregation is possible, information indicative of "valid" (indicated by "○" in FIG. 4) is stored and when the aggregation is impossible, information indicative of "invalid" (indicated by "–" in FIG. 4) is stored. The transfer valid/invalid information 504 makes an indication as to whether the path technique conversion based on transfer is possible between the path technique the input side NW path technique information 501 indicates and the path technique the output side NW path technique information 502 indicates and, like the aggregation valid/invalid information 503, information indicative of, for example, "valid" or "invalid" is stored. It will be appreciated that the individual pieces of information in the conversion scheme correspondence table 500 are stored in advance.

Exemplarily, other examples of conversion scheme between individual path techniques are as below. In the following parenthesis ( ), the left-hand indicates a path technique of input side segment and the right-hand indicates a path technique of output side segment.

| | |
|---|---|
| (VLAN, VLAN) | transfer |
| (VLAN, PB) | aggregation |
| (VLAN, MPLS) | aggregation, transfer |
| (VLAN, MPLS-TP) | aggregation, transfer |
| (VLAN, PBB) | aggregation, transfer |
| (PB, PBB) | aggregation |
| (PB, MPLS) | aggregation, transfer |
| (PB, MPLS-TP) | aggregation, transfer |
| (PBB, PBB) | transfer |
| (PBB, MPLS) | aggregation, transfer |
| (PBB, MPLS-TP) | aggregation, transfer |
| (MPLS, MPLS) | transfer |
| (MPLS, MPLS-TP) | aggregation, transfer |

FIG. 6 diagrammatically shows the identifier correspondence table 700.

The identifier correspondence table 700 contains, for example, path technique information 701 of input side NW (input side segment), path technique information 702 of output side NW (output side segment), conversion type 703, pre-conversion identifier 704, post-conversion identifier 705 and identifier draw-out method 706.

The input side NW path technique information 701 and output side NW path technique information 702 resemble the input side NW path technique information 501 and output side path technique information 502 of the aforementioned conversion scheme correspondence table 500. The conversion type 703 indicates the type of conversion scheme and information indicative of, for example, "transfer" or "aggregation" is stored. The pre-conversion identifier 704 stored in the identifier correspondence table 700 indicates candidates for selection of the type of pre-conversion identifier. Also, the post-conversion identifier 705 stored in the identifier correspondence table 700 indicates candidates for selection of the type of post-conversion identifier. Stored in each of the pre-conversion identifier 704 and post-conversion identifier 705 is one or a plurality of pieces of information indicative of types such as, for example, "C-TAG (Customer VLAN Tag)", user VLAN tag)", "S-TAG (Service VLAN Tag)", "I-TAG (Service Instance Tag)", "B-TAG (Backbone VLAN Tag)" and "LSP". It will be appreciated that the type of pre-conversion identifier and the type of post-conversion identifier are pieces of information such as C-TAG as described previously and that the pre-conversion identifier designates a value such as "001" or a letter as will be described later.

The identifier draw-out method 706 indicates candidates for post-conversion identifier draw-out method. For example, one or a plurality of draw-out methods such as "novel draw-out" and "utilization of C-TAG before conversion" are stored. When the conversion type 703 is "transfer", one or a plurality of the "novel draw-out" method and a suitable draw-out method utilizing a pre-conversion header are stored as the identifier draw-out method 706, thus permitting the operator to select any one of them. Further, when the conversion type 703 is "aggregation", a header before conversion can be maintained through encapsulation and therefore, only the "novel draw-out" may be stored as the identifier draw-out method 706. To add, individual pieces of information of identifier correspondence table 700 are stored in advance.

FIG. 9 diagrammatically shows the conversion table 900.

The conversion table 900 contains, for example, route information, pre-conversion identifier information and post-conversion identifier information. In an example shown in FIG. 9, as the route information, Virtual Route ID 901, I-CPE (Ingress Customer Premises Equipment) 902, E-CPE (Egress Customer Premises Equipment) 903 and Traffic Class 904 are stored. The example of FIG. 9 gives an example of conversion from PBB to MPLS and as pre-conversion identifier information, identifiers of respective C-TAG 905, S-TAG 906, I-TAG 907 and B-TAG 908 are stored and as post-conversion information, an identifier of LSP 909 is stored.

The Virtual Route ID 901 indicates information for identifying a path between the CPE's 111 and 118. The I-CPE 902 indicates information for identifying a user device on the input side (for example, CPE 111). The E-CPE 903 indicates information for identifying a user device on the output side (for example, CPE 118). The Traffic Class 904 indicates a traffic class on a path. To add, the Traffic Class 904 may be omitted. It is to be noted that the pre-conversion identifier and the post-conversion identifier are not limited to the illustrated examples and may be stored with suitable header/label identifiers according to selection by the operator.

(Process During Initial Setting)

Figure 2:
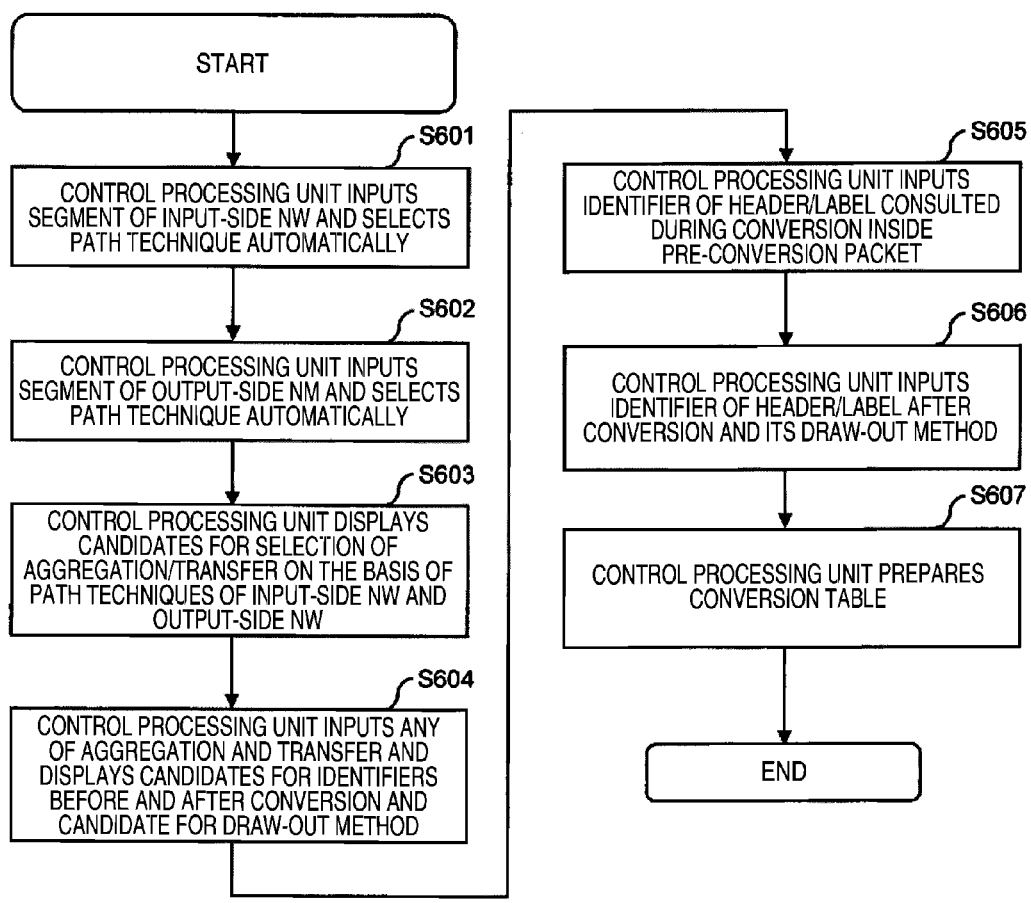
FIG. 2 is a flowchart at the time of initial setting.
Figure 3:
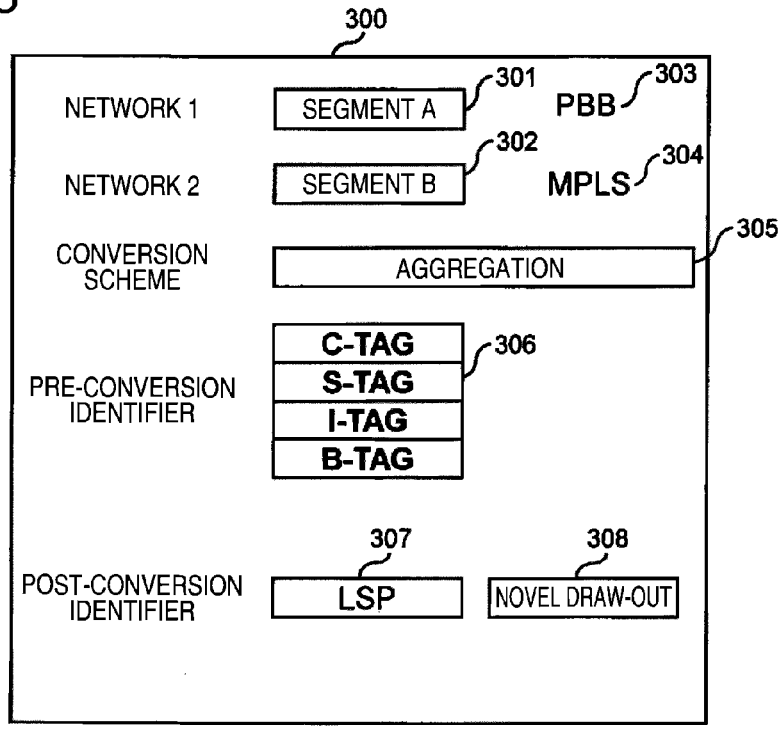
FIG. 3 is a diagram for explaining an screen image of a management terminal.

In FIG. 2, a flowchart during initial setting is shown. Illustrated in FIG. 3 is a diagram for explaining a screen image of the management terminal 120.

Firstly, the control processing unit 200 inputs from the management terminal 120 segment ID's of input side NW segments 101 to 105 selected on the basis of an operation by the operator and selects automatically path technique s corresponding to the inputted segment ID's (S601). More specifically, under the operation by the operator, the management terminal 120 inputs a segment ID from the input unit and transmits it to the transport control server 100, and the GUI controller 201 receives the segment ID from the management terminal 120. On the basis of the received segment ID, the conversion scheme manager 203 consults a segment ID 401 of the segment/path technique correspondence table 400 to select corresponding path technique information 402. FIG. 3 shows an example where a "segment A" is selected and a corresponding path technique "PBB" is displayed in the management terminal 120 (see 301 and 303 in FIG. 3). The management terminal 120 may display on its display unit a plurality of segment names or segment ID's representing candidates for selection. A segment name or ID representing a candidate for selection may be displayed on the basis of a segment ID of the segment/path technique correspondence table 500 in transport control server 100.

The control processing unit 200 inputs from the management terminal 120 segment ID's of output side NW segments 101 to 105 selected on the basis of an operation by the operator and selects automatically path techniques corresponding to the inputted segment ID's (S602). Concrete operation is similar to the aforementioned step S601. FIG. 3 shows an example where a "segment B" is selected and a corresponding path technique "MPLS" is displayed (see 302 and 304 in FIG. 3).

On the basis of the path techniques of input-side NW and output-side NW, the control processing unit 200 displays in the management terminal 120 candidates for selection of a conversion scheme indicating aggregation and/or transfer (S603). More specifically, on the basis of the path technique information 402 of input-side NW selected in step S601 and the path technique information 402 of output-side NW selected in step 602, the conversion scheme manager 203 makes reference to path technique information 501 of input-side NW and path technique information 502 of output-side NW in the conversion scheme correspondence table 500 to judge, from corresponding aggregation valid/invalid information 503 and transfer valid/invalid information 504, a candidate for selection of the conversion scheme. For example, when the aggregation valid/invalid information 503 is valid (○), the conversion scheme manager 203 can determine a conversion scheme based on aggregation as a selection candidate (aggregation being possible). On the other hand, when the aggregation valid/invalid information 503 is invalid (–), the conversion scheme manager 203 does not determine a conversion scheme based on aggregation as a selection candidate (aggregation being impossible). A decision can also be made on the transfer valid/invalid information 504 in a similar manner. The GUI controller 201 transmits the candidate for selection of conversion scheme to the management terminal 120. The management terminal 120 receives the conversion scheme selection candidate and displays the received conversion scheme selection candidate on the display unit.

The control processing unit 200 inputs from the management terminal 120 any of the aggregation and transfer conversion schemes and displays in the management terminal 120 candidates for pre-conversion identifiers, candidates for post-conversion identifiers and candidates for methods of drawing out post-conversion identifiers (S604). More specifically, when the GUI controller 201 receives the information indicative of the conversion scheme (conversion type) selected on the basis of the operation by the operator, the conversion scheme manager 203 consults the input side NW path technique information 701, output side NW path technique information 702 and conversion type 703 in the identifier correspondence table 700 on the basis of the input side NW path technique information 402 selected in step S601, the output side NW path technique information 402 selected in step S602 and the received conversion scheme to thereby capture corresponding pre-conversion identifier type 704, post-conversion identifier type 705 and identifier draw-out method 706. The GUI controller 201 transmits the captured pre-conversion identifier type 704, post-identifier type 705 and identifier draw-out method 706 to the management terminal 120. The management terminal 120 receives the type of pre-conversion identifier, the type of post-conversion identifier and the identifier draw-out method and displays, on the display unit, the received pre-conversion identifier type, post-conversion identifier type and identifier draw-out method.

The control processing unit 200 inputs from the management terminal 120 the identifier of header/label to which it makes reference when converting the path technique within the pre-conversion packet (S605). It will be appreciated that the type of pre-conversion identifier is designated from candidates for types of the pre-conversion identifier displayed in step S604 on the basis of an operation by the operator. FIG. 3 shows an example where as the pre-conversion identifier types, "C-TAG", "S-TAG", "I-TAG" and "B-TAG" are designated (see 306 in FIG. 3).

The control processing unit 200 inputs from the management terminal 120 the identifier of header/label after conversion (post-conversion identifier) and the post-conversion identifier draw-out method (S606). It will be appreciated that the type of post-conversion identifier and the draw-out method of post-conversion identifier are designated from candidates for the post-conversion identifier and candidates for the draw-out method of post-conversion identifier which are displayed in step 604 on the basis of operation by the operator.

FIG. 3 shows an example where "LSP" as the post-conversion identifier type, and the post-conversion identifier draw-out method of "novel draw-out" are designated (see 307 and 308 in FIG. 3).

The control processing unit 200 prepares the conversion table 900 (S607). More specifically, the conversion scheme manager 203 prepares a conversion table 900 containing a field of route information, a field corresponding to the type of the inputted pre-conversion identifier and a field corresponding to the type of the inputted post-conversion identifier and stores the thus prepared conversion table 900 in the conversion table storage 209. For example, in an example of conversion table 900 shown in FIG. 9, the route information includes fields of Virtual Route ID 901 to Traffic Class 904, fields of C-TAG 905 to B-TAG 908 inputted in step 605 and a field of LSP 909 inputted in step S606. Also, the conversion scheme manager 203 stores the inputted conversion scheme and the inputted post-conversion identifier draw-out method in, for example, the conversion table storage 209. In respect of two segments to be selected, the conversion scheme, the draw-out method and the conversion table 900 are stored in the conversion table storage 209.

The control processing unit 200 repeats the aforementioned processes in step S601 to S607 in connection with each of the two segments to be coupled and prepares a conversion table 900 in respect of each of two segments to be coupled. When a single gateway node is arranged between adjacent ones of the individual segments 101 to 105, the processes in steps S601 to S607 are repeated for each of the gateway nodes. When a plurality of gateway nodes are arranged between adjacent ones of the individual segments 101 to 105, a single conversion table 900 is prepared in respect of individual gateway nodes coupled with identical two segments. The conversion table 900 having its input side and output side inverted can be prepared similarly.

(Process during Route Setting)

Figure 11:
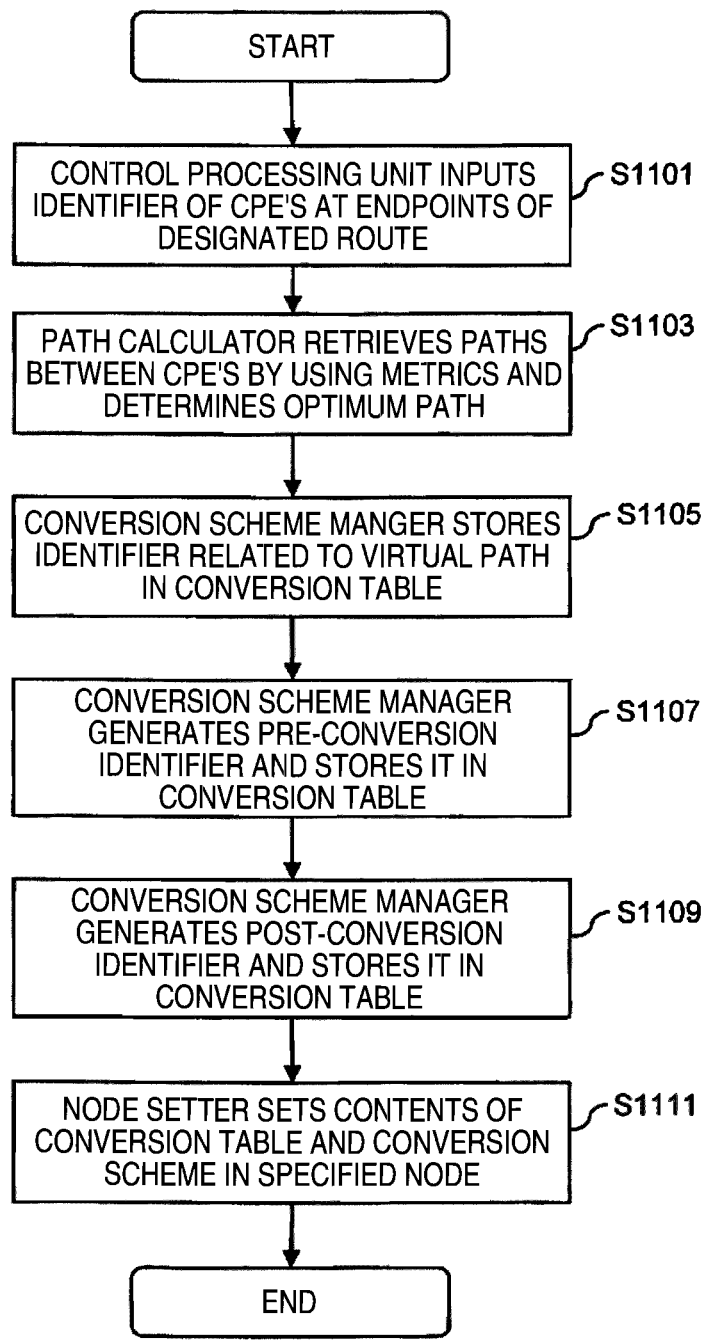
FIG. 11 is a flowchart when setting a path.

FIG. 11 shows a flowchart during path setting.

The control processing unit 200 receives from the management terminal 120 inputs of identifiers of route endpoints (CPE 112 and 118) designated under operation by the operator (S1101).

The route calculator 202 retrieves routes between the CPE's 112 and 118 by using metrics to thereby determine an optimum route (S1103). In this phase, the route calculator 202 may display in the management terminal 120 candidates for a plurality of paths and determine a route by inputting a route selected on the basis of an operation by the operator. It is to be noted that the route calculator 202 can determine an optimum route and a candidate for route in accordance with suitable protocol or algorithm. The route calculator 202 specifies nodes 112 to 117 through which a determined route (virtual path) extends. Also, the route calculator 202 allots, at a suitable timing, an ID to a path extending through the determined route.

The conversion scheme manager 203 executes processes in the following individual steps S1105 to S1109 in respect of individual conversion tables 900 corresponding to the specified nodes. The conversion table 900 is prepared and stored in respect of individual two segments to be coupled and a conversion table 900 corresponding to two segments coupled with specified nodes can be specified. An identifier of the corresponding node may be stored in the individual conversion tables 900. The individual steps S1105 to S1109 will be described hereinafter.

The conversion scheme manager 203 stores individual identifiers related to the path at path information in conversion table 900 (S1105). More specifically, the conversion scheme manager 203 stores an ID of an allotted path, identifiers of input side CPE 111 (or 118) and output side CPE 118 (or 111) and a traffic class in individual fields of Virtual Route ID 901, I-CPE 902, E-CPE 903 and Traffic Class 904 of the conversion table 900, respectively. In the example shown in FIG. 9, "001", "001", "002" and "A" are stored in Virtual Route, ID 901, I-CPE 902, E-CPE 903 and Traffic Class 904, respectively. To add, the traffic class can be set as necessary.

The conversion type manager 203 generates a pre-conversion identifier and stores the thus generated pre-conversion identifier in a conversion table 900 in correspondence to the Virtual Route ID 901 (S1107). For example, in connection with a pre-conversion identifier of the node 112 coupled at its input side to the CPE 111, an identifier set by the operator may be inputted. The identifier may also be generated in accordance with protocol, for example, between the CPE 111 and the node 112. Further, for pre-conversion identifiers of other nodes 113 to 117 on the path, post-conversion identifiers of nodes 112 to 116 for the same segment to be generated in, for example, step S1109 to be described later may be used. In the example shown in FIG. 9, "001" is stored in each of the C-TAG 905 to B-TAG 908.

The conversion scheme manager 203 generates a post-conversion identifier and stores the thus generated post-conversion identifier in the conversion table 900 in correspondence to the virtual Route ID 901 (S1109). More specifically, the conversion scheme manager 203 generates a post-conversion identifier in accordance with the stored post-conversion identifier draw-out method. For example, when the post-conversion identifier draw-out method is "novel draw-out", the conversion scheme manger 203 can use unused identifiers within a pool in which a plurality of identifiers have been stored in advance. Also, when the post-conversion identifier draw-out method is "put C-TAG into a lower bit", the conversion scheme manager 203 captures from a conversion table 900 the C-TAG 905 and can generate a post-conversion identifier containing a value of the captured C-TAG 905 at a lower bit. To add, the aforementioned example is not limitative and a post-conversion identifier may be generated suitably in accordance with a draw-out method. In the example shown in FIG. 9, "001" is stored at LSP 909.

For a specified node, the node setter 204 sets the contents of the corresponding conversion table 900 and the stored conversion scheme (S1111). The contents of the set conversion table 900 contains, for example, a pre-conversion identifier and a post-conversion identifier. In the example shown in FIG. 9, respective identifiers C-TAG 905 to B-TAG 908 and an identifier of LSP 909 are contained. The above is not limitative and the node setter 204 may further set any or a plurality of pieces of information of Virtual Path ID 901 to Traffic Class 904 of the conversion table 900.

As described above, for the conversion table 900 corresponding to the specified node through which the path extends, steps S1105 to S1109 are executed and the individual nodes can be set.

(Conversion Process in Node)

Figure 7:
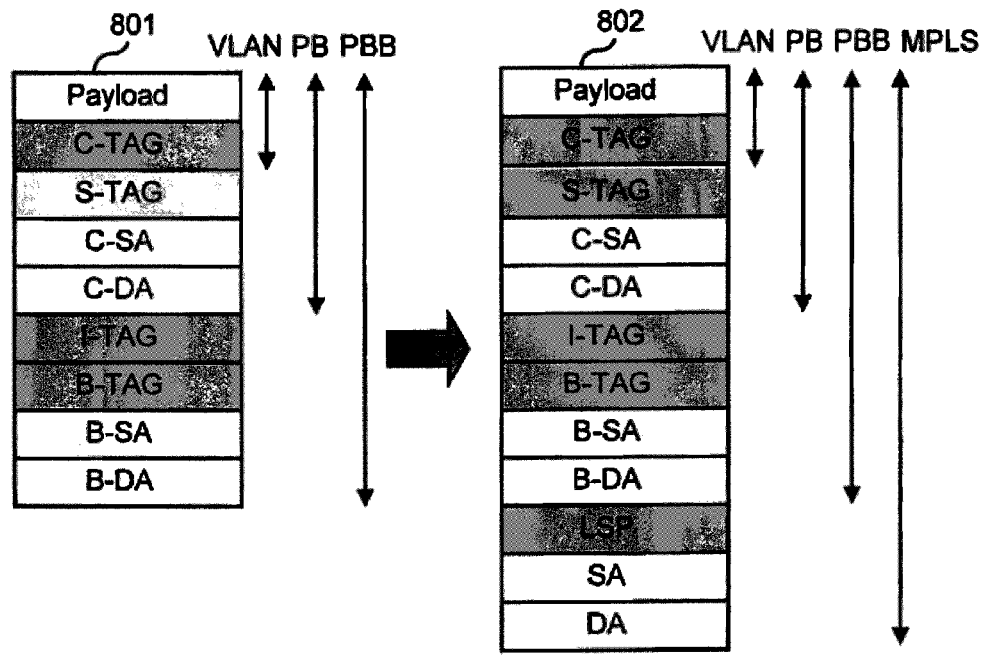
FIG. 7 is a diagram for explaining a conversion scheme based on aggregation.

FIG. 7 diagrammatically explains the conversion scheme based on aggregation.

An instance will be described in which "aggregation" is set as conversion scheme for node 114 and the node 114 converts a PBB packet to a MPLS packet in accordance with a conversion scheme of aggregation. It is to be noted that the operation of aggregation in other nodes 112, 113 and 115 to 117 and in other path techniques is similar.

When receiving a PBB packet 801, the node 114 tunnels (aggregates, encapsulates) the PBB packet 801 at a LSP level. More specifically, the node 114 consults a header corresponding to a pre-conversion identifier set to the received PBB packet 801. For example, in the case of the example shown in FIG. 9, headers of pre-conversion identifiers C-TAG 905 to B-TAG 908 are consulted. On the basis of identifiers of the individual consulted headers (for example, "001"), the node 114 makes reference to C-TAG 905 to B-TAG 908 in the conversion table set to the node 114 to thereby capture a corresponding LSP 909. In the example shown in FIG. 9, "001" is acquired. The node 114 generates a LSP label containing the acquired LSP 909. By using the thus generated LSP label, the node 114 encapsulates the PBB packet 801 to generate a MPLS packet 802. To add, the MPLS packet 802 can further contain headers of SA (Source Address) and DA (Destination Address). The SA and DA can be determined automatically by, for example, an adjoining MPLS node.

Figure 8:
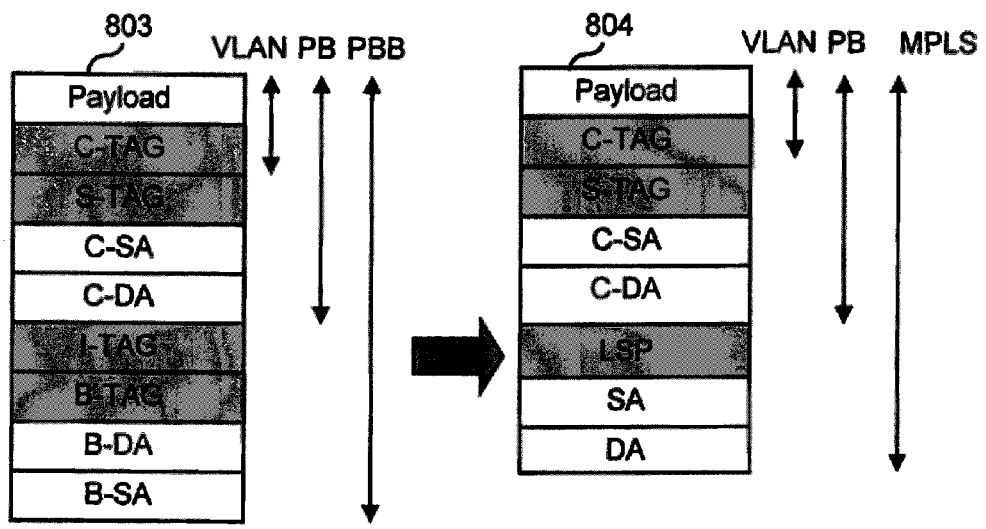
FIG. 8 is a diagram for explaining a conversion scheme based on transfer.

FIG. 8 diagrammatically explains the conversion scheme based on transfer.

An instance will be described in which "transfer" is set as conversion scheme in the node 114 and the node 114 converts a PBB packet to a MPLS packet in accordance with the transfer conversion scheme. It is to be noted that the transfer operation in other nodes 112, 113 and 115 to 117 and in other path techniques are similar.

When receiving a PBB packet 803, the node 114 converts (transfers) a PBB header to a LSP label. More specifically, like the aforementioned aggregation case, the node 114 captures from the conversion table 900 a corresponding post-conversion identifier on the basis of an identifier of the consulted header. For example, post-conversion identifiers of C-TAG, S-TAG and LSP corresponding to C-TAG, S-TAG, I-TAG and B-TAG of the PBB packet 803 are captured. The node 114 replaces the pre-conversion identifier with the captured post-conversion identifier (C-TAG, S-TAG and LSP), generating a MPLS packet 804. For example, as shown in FIG. 8, a PBB header of I-TAG, B-TAG, B-DA and B-SA change to a MPLS header of LSP label, SA and DA. To add, the C-TAG and S-TAG of MPLS packet 804 are generated on the basis of the selected drawn-out method as described previously and so, they will sometimes be same as those of the PBB packet 803 and will sometimes be newly drawn out.

According to the present embodiment, on the basis of a policy unique to the operator, for example, the aggregation or transfer (conversion scheme) of the path, the type of pre-conversion identifier, the type of post-conversion identifier and the method for drawing out the post-conversion identifier can be designated from predetermined candidates for selection and besides, during setting of the path between the CPE's, the precedently designated conversion scheme, pre-conversion identifier and post-conversion identifier can be set automatically to a gateway node through which a path extends. Further, in accordance with the precedently designated draw-out method, a post-conversion identifier can be designated automatically.

(Modified Embodiment)

In the embodiment set forth so far, the operator sequentially selects two segments to be coupled and the control processing unit 200 prepares identifier correspondence tables 700 in respect of the individual two segments to be coupled.

Figure 12:
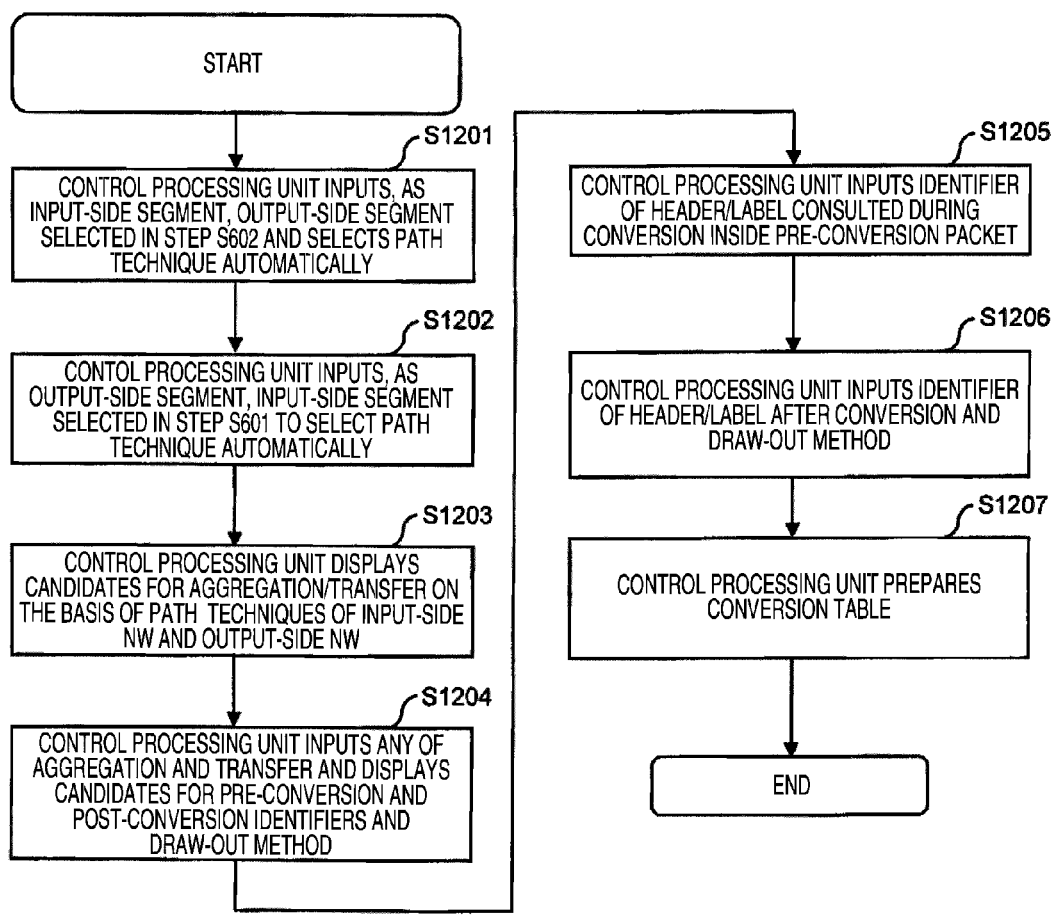
FIG. 12 is a flowchart for preparation of an identifier correspondence table in reverse direction.

Then, for example, the control processing unit 200 may render the output side segments 101 to 105 selected in the previously-described step S602 the input side segments, render the input-side segments 101 to 105 selected in the step S601 the output side segments and execute steps S1201 to S1207 in FIG. 12, thus automatically preparing an inversely directed identifier correspondence table 700.

Further, in the path between CPE's 111 and 118, two segments of the same path technique to be coupled (for example, the segments 102 and 104 and the segments 101 and 105) will sometimes be located symmetrically to the center of a core network (for example, segment 103). Exemplarily, for the node 113 coupled with the VLAN and PBB segments, the node 116 coupled with segments subject to identical path techniques is specified. In this case, the control processing unit 200 may keep, as segment symmetry correspondence table 410 of FIG. 13, information concerning segment symmetry inputted by the operator by the use of the management terminal 120 in the segment storage 207, may prepare an identifier correspondence table of a node A between two segments in step S1301, may specify a node B between the two segments which is symmetrical thereto in step S1302, and may prepare an identifier correspondence table 700 of the node B on the basis of the identifier correspondence table 700 of node A in step S1303.

While the embodiments of the present invention have been described particularly, the present invention is not limited to these embodiments and can be changed and modified variously without departing from the gist of the present invention.

Industrial Applicability

The present invention can be utilized for a wide area Ether service coupled with different types of networks, a next generation private line service, a VPN service and so on.

| REFERENCE SIGNS LIST | |
|---|---|
| 100 | Transport control server |
| 101 to 105 | Segments |
| 111, 118 | CPE |
| 112 to 117 | Nodes |
| 120 | Management terminal |
| 200 | Control processing unit |
| 201 | GUI controller |
| 202 | Route calculator |
| 203 | Conversion scheme manager |
| 204 | Node setter |
| 205 | Communication IF |
| 206 | Data storage |
| 207 | Segment storage |
| 208 | Conversion scheme storage |
| 209 | Conversion table storage |

The invention claimed is:

1. A transport control system comprising, in a network through which communication is made between devices by way of a plurality of network segments of different path techniques, a plurality of gateway nodes each arranged between two network segments to be coupled thereto and adapted to convert a header of a received packet in accordance with the path techniques of the two network segments and to transmit the converted header and a transport control server for controlling the gateway nodes, wherein said transport control server includes;

a conversion table storage stored in advance with a conversion table containing a pre-conversion identifier for specifying a packet subject to aggregation of path or transfer of path in respect of each of said two network segments to be coupled and a post-conversion identifier to be added to a header of a received packet and with conversion types indicative of aggregation of path or transfer of path, and a control processing unit, and wherein said control processing unit calculates, when the devices at the endpoints of a path are designated, a route between the devices and specifies one or a plurality of said gateway nodes on the route, acquires, for the individual specified gateway nodes, pre-conversion identifiers, post-conversion identifiers and conversion types corresponding to the two network segments the gateway couple from said conversion table storage and sets them to said gateway nodes, and said gateway node encapsulates, when the set conversion type indicates aggregation, the received packet containing the set pre-conversion identifier by using the set post-conversion identifier and transmits the encapsulated received packet, and replaces the pre-conversion identifier with the set post-conversion identifier for the received packet containing the set pre-conversion identifier when the set conversion type indicates transfer and transmits the received packet added with the post-conversion identifier.

2. A transport control system according to claim 1, wherein said conversion table storage is further stored with a method of drawing out post-conversion identifiers in respect of the individual two network segments to be coupled; and said control processing unit captures, from said conversion table storage, draw-out methods corresponding to the two network segments coupled with said gateway node in respect of the specified individual gateway nodes, determines post-conversion identifiers in accordance with the draw-out methods and stores the thus determined post-conversion identifiers in said conversion table.

3. A transport control system according to claim 2, wherein said draw-out method indicates any of novel draw-out and preparation based on the pre-conversion identifier; and said control processing unit draws out, when the draw-out method indicates a novel draw-out, an identifier from a pool stored in advance with a plurality of identifiers and stores, as a post-conversion identifier, the draw-out identifier in said conversion table, and when the draw-out method indicates preparation based on the pre-conversion identifier, prepares a post-conversion identifier on the basis of the pre-conversion identifier stored in said conversion table and stores it in said conversion table.

4. A transport control system according to claim 1, wherein said transport control server further includes;

a segment/path technique correspondence table stored, in advance and in correspondence with information for identifying a network segment, with path technique information of the network segment, and a conversion scheme correspondence table stored, in advance and in correspondence with pieces of path technique information of two network segments to be coupled, with aggregation valid/invalid information indicating whether aggregation of path is possible between the two network segments and transfer valid/invalid information indicating whether transfer of path is possible, and wherein said control processing unit;

inputs pieces of information for identifying two desired network segments, captures individual pieces of path technique information corresponding to the individual pieces of network segment identifying information from said segment/path technique correspondence table, specifies corresponding aggregation valid/invalid information and transfer valid/invalid information by consulting said conversion scheme correspondence table on the basis of the individual captured path technique information pieces, judges, on the basis of the specified aggregation valid/invalid information and transfer valid/invalid information, whether the aggregation of path is possible and the transfer of path is possible, and stores conversion type indicative of the path aggregation or the path route transfer determined possible in said conversion table storage in correspondence with the inputted information pieces for identifying said two network segments.

5. A transport control system according to claim 4, wherein when both of the aggregation and transfer are determined possible, said control processing unit gives a display as to which one of the aggregation and transfer is to be selected, inputs a conversion type indicative of any of the aggregation and transfer selected by the operator, and stores the inputted conversion type in said conversion table storage.

6. A transport control system according to claim 1, wherein said transport control server has an identifier correspondence table stored in advance with types of pre-conversion identifier and types of post-conversion identifier in correspondence with pieces of path technique information and conversion type of two network segments, and said control processing unit acquires corresponding pre-conversion identifier type and post-conversion identifier type by consulting said identifier correspondence table on the basis of the path technique information corresponding to information for identifying the inputted two network segments, inputs a pre-conversion identifier type and a post-conversion identifier type which are selected by the operator from the acquired pre-conversion identifier type and post-conversion identifier type, and prepares, in said conversion table storage, the conversion table having a field to be stored with the inputted type pre-conversion identifier and a field to be stored with the inputted type post-conversion identifier.

7. A transport control system according to claim 6, wherein said identifier correspondence table is further stored with post-conversion identifier draw-out methods in correspondence with path technique information of two network segments and conversion type, and said control processing unit acquires a corresponding draw-out method by consulting said identifier correspondence table on the basis of path technique information and conversion type corresponding to information for identifying inputted two network segments and stores the captured draw-out method in respect of the individual two network segments to be coupled, acquires, in respect of specified individual gateway nodes, draw-out methods corresponding to two network segments to be coupled to the gateway nodes from said conversion table storage, determines a post-conversion identifier in accordance with the draw-out method, and stores the thus determined post-conversion identifier in said conversion table.

8. A transport control system according to claim 7, wherein said identifier correspondence table is stored with a plurality of post-conversion identifier draw-out methods and said control processing unit gives a display as to which one of the plural draw-out methods stored in said identifier correspondence table is to be selected, inputs a draw-out method selected by the operator, and stores the inputted draw-out method in said conversion table.

9. A transport control system according to claim 7, wherein said draw-out method indicates any of novel draw-out and preparation based on the pre-conversion identifier; and said control processing unit draws out, when the draw-out method indicates a novel draw-out, an identifier from a pool stored in advance with a plurality of identifiers and stores, as a post-conversion identifier, the draw-out identifier in said conversion table and, when the draw-out method indicates preparation based on the pre-conversion identifier, prepares a post-conversion identifier on the basis of the pre-conversion identifier stored in said conversion table and stores it in said conversion table.

10. A transport control system according to claim 1, wherein a plurality of gateway nodes are arranged between two segments to be coupled, and said conversion table corresponds to the plurality gateway nodes.

11. A transport control server for use in a transport control system having, in a network through which communication is made between devices by way of a plurality of network segments of different path techniques, a plurality of gateway nodes each arranged between two network segments to be coupled and adapted to encapsulate, when a set conversion type indicates aggregation, a received packet containing the set pre-conversion identifier by using the set post-conversion identifier and transmits the encapsulated received packet and to replace, when the set conversion type indicates transfer, the pre-conversion identifier with the set post-conversion identifier for the received packet containing the set pre-conversion identifier and to transmit the received packet added with the post-conversion identifier, said transport control server being operative to control the gateway nodes, said transport control server comprises:

a conversion table storage stored in advance with a conversion table containing a pre-conversion identifier for specifying a packet subject to aggregation of route or transfer of route in respect of each of the two network segments to be coupled and a post-conversion identifier to be added to a header of a received packet and with conversion types indicative of aggregation of route or transfer of route; and a control processing unit, wherein said control processing unit calculates, when the devices at the endpoints of a path are designated, a route between the devices and specifies one or a plurality of the gateway nodes on the route, and acquires, for the individual specified gateway nodes, pre-conversion identifiers, post-conversion identifiers and conversion types corresponding to the two network segments the gateways couple from the conversion table storage and sets them to the gateway nodes.

12. A transport control server according to claim 11, wherein said conversion table storage is further stored with a method of drawing out post-conversion identifiers in respect of the individual two network segments to be coupled; and said control processing unit captures, from said conversion table storage, draw-out methods corresponding to the two network segments coupled with said gateway node in respect of the specified individual gateway nodes, determines post-conversion identifiers in accordance with the draw-out methods and stores the thus determined post-conversion identifiers in said conversion table.

13. A transport control server according to claim 12, wherein said draw-out method indicates any of novel draw-out and preparation based on the pre-conversion identifier; and said control processing unit draws out, when the draw-out method indicates a novel draw-out, an identifier from a pool stored in advance with a plurality of identifiers and stores, as a post-conversion identifier, the draw-out identifier in said conversion table, and when the draw-out method indicates preparation based on the pre-conversion identifier, prepares a post-conversion identifier on the basis of the pre-conversion identifier stored in said conversion table and stores it in said conversion table.

14. A transport control server according to claim 11 further comprising:

a segment/path technique correspondence table stored, in advance and in correspondence with information for identifying a network segment, with path technique information of the network segment, and a conversion scheme correspondence table stored, in advance and in correspondence with pieces of path technique information of two network segments to be coupled, with aggregation valid/invalid information indicating whether aggregation of path is possible between the two network segments and transfer valid/invalid information indicating whether transfer of path is possible, wherein said control processing unit;

inputs pieces of information for identifying two desired network segments, captures individual pieces of path technique information corresponding to the individual pieces of network segment identifying information from said segment/path technique correspondence table, specifies corresponding aggregation valid/invalid information and transfer valid/invalid information by consulting said conversion scheme correspondence table on the basis of the individual captured path technique information pieces, judges, on the basis of the specified aggregation valid/invalid information and transfer valid/invalid information, whether the aggregation of path is possible and the transfer of path is possible, and stores conversion type indicative of the path aggregation or the path transfer determined possible in said conversion table storage in correspondence with the inputted information for identifying said two network segments.

15. A transport control server according to claim 14, wherein when both of the aggregation and transfer are determined possible, said control processing unit gives a display as to which one of the aggregation and transfer is to be selected, inputs a conversion type indicative of any of the aggregation and transfer selected by the operator, and stores the inputted conversion type in said conversion table storage.

16. A transport control server according to claim 11 further comprising an identifier correspondence table stored in advance with types of pre-conversion identifier and types of post-conversion identifier in correspondence with pieces of path technique information and conversion type of two network segments, wherein said control processing unit acquires corresponding pre-conversion identifier type and post-conversion identifier type by consulting said identifier correspondence table on the basis of the path technique information corresponding to information for identifying the inputted two network segments, inputs a pre-conversion identifier type and a post-conversion identifier type which are selected by the operator from the acquired pre-conversion identifier type and post-conversion identifier type, and prepares, in said conversion table storage, the conversion table having a field to be stored with the inputted type pre-conversion identifier and a field to be stored with the inputted type post-conversion identifier.

17. A transport control server according to claim 16, wherein said identifier correspondence table is further stored with post-conversion identifier draw-out methods in correspondence with path technique information of two network segments and conversion type, and said control processing unit acquires a corresponding draw-out method by consulting said identifier correspondence table on the basis of path technique information and conversion type corresponding to information for identifying inputted two network segments and stores the captured draw-out method in respect of the individual two network segments to be coupled, acquires, in respect of specified individual gateway nodes, draw-out methods corresponding to two network segments to be coupled to the gateway nodes from said conversion table storage, determines a post-conversion identifier in accordance with the draw-out method, and stores the thus determined post-conversion identifier in said conversion table.

18. A transport control server according to claim 17, wherein said identifier correspondence table is stored with a plurality of post-conversion identifier draw-out methods and said control processing unit gives a display as to which one of the plural draw-out methods stored in said identifier correspondence table is to be selected, inputs a draw-out method selected by the operator, and stores the inputted draw-out method in said conversion table.

19. A transport control server according to claim 17, wherein said draw-out method indicates any of novel draw-out and preparation based on the pre-conversion identifier; and said control processing unit draws out, when the draw-out method indicates a novel draw-out, an identifier from a pool stored in advance with a plurality of identifiers and stores, as a post-conversion identifier, the draw-out identifier in said conversion table and, when the draw-out method indicates preparation based on the pre-conversion identifier, prepares a post-conversion identifier on the basis of the pre-conversion identifier stored in said conversion table and stores it in said conversion table.

* * * * *